United States Patent [19]

Pehrson, Sr. et al.

[11] 4,319,406
[45] Mar. 16, 1982

[54] LASER TARGETS FOR ROLLER ALIGNMENT

[76] Inventors: John V. Pehrson, Sr.; Marie S. Pehrson, both of 851 Deming Way, Sparks, Nev. 89431

[21] Appl. No.: 75,117

[22] Filed: Sep. 13, 1979

[51] Int. Cl.³ .......................... G01C 15/12; C01B 5/25
[52] U.S. Cl. ....................................... 33/295; 33/286; 33/182
[58] Field of Search ................ 33/293, 294, 295, 296, 33/286, 182

[56] References Cited

U.S. PATENT DOCUMENTS

| | | | |
|---|---|---|---|
| 3,599,336 | 8/1971 | Walsh | 33/293 |
| 3,634,941 | 1/1972 | Roodvoets et al. | 33/295 |
| 4,031,633 | 6/1977 | Bjork | 33/295 |

Primary Examiner—Steven L. Stephan
Attorney, Agent, or Firm—Julian Caplan

[57] ABSTRACT

To align pipe mill rollers and the like both vertically and axially, targets are clamped to the rolls. Each target carries a block formed with a hole, which hole is a fixed distance above the surface of the target which engages the edges of a roll. The block is mounted for transverse movement and carries a horizontally movable indicator which may be aligned with a mark on the center of the roll. A laser instrument is located so that its beam is horizontal and will pass through each hole of each block of each target when the rolls are properly aligned. The targets carry level bubbles to insure vertical positioning of the targets and also may carry supports which engage opposite sides of the roll flanges to insure that the targets are vertical. The workman observes the point where the beam shows on the block and adjusts the bearings for the roll vertically so that the beam is at the level of the hole. The bearings are also adjusted horizontally (axially of the roll) so that the indicator is aligned with the marking on the roll. The bearings for each roll are adjusted in sequence and, when completed, the beam passes through all holes and each indicator is aligned with the center of the roll on which it is mounted.

8 Claims, 5 Drawing Figures

LASER TARGETS FOR ROLLER ALIGNMENT

This invention relates to a new and improved laser target for roller alignment and more particularly for aligning both vertically and horizontally-transversely a series of pipe mill rollers or the like.

Pipe mills comprise a series of stands in which bottom and top rolls are mounted by bearings which are adjustable in such manner that the rolls may be raised and lowered and also may be moved horizontally-transversely. For proper operation of the roll it is essential that there be extreme accuracy in the roll alignment in the sense that all of the rolls must be at the same elevation and the centers of all of the rolls must be in a straight line. From time to time it is necessary to remove the roll for change in pipe size or in order to grind rolls which have become worn. Accordingly, installation of the rolls is fairly frequent. Hence a rapid and extremely accurate means of alignment is a prime concern to mill operators. The present invention provides a means for roll alignment employing targets attached to the rolls, each target having a hole through which a laser beam may pass when the rolls are in perfect alignment. Thus it is merely necessary to accurately locate the laser beam generator at the proper elevation and to adjust the direction of the beam so that it passes a fixed distance above the elevation of the axis of the roll and in a straight line through the center of each millstand.

The present invention provides individual targets for each roll and the targets are clamped to their respective rolls. Each target contains a block formed with a hole through which the beam is to pass. The shape of the target is such that when clamped to the roll the hole in the block is a fixed, predetermined distance above the axis of rotation of the roll. Each target also provides means for accurately measuring the horizontal distance between the hole in the target and the center of the roll. By moving the roll vertically the hole may be aligned with the beam. By moving the bearings for the rolls horizontally-transversely the hole may be brought into position directly above the center of the roll. Each roll is thus adjusted in turn until the beam passes through the holes in the blocks of all of the targets for the series of rolls.

Further, to insure accuracy, target supports are provided for each target which insure that the target is vertical rather than slanted.

To provide means for horizontal-transverse alignment, an indicator is mounted on the block and moves with the block and is visually aligned with a mark on the center of the roll. A scale is fixed to the target and is read with the indicator to determine the distance which the roll is off center. A vernier attachment may be used in conjunction with the scale for extreme accuracy. The present invention is adapted to different size rolls merely by providing different targets shaped for use with such rolls.

In the drawings and following description the invention is shown used in installing bottom rolls of a pipe roll mill. It will be understood that the top rolls may be similarly adjusted by means which will readily occur to one skilled in this art. Further, although the invention finds particular utility in pipe mills and in mills where fins are rolled on the pipe, nevertheless it will be understood that the invention may be used with other types of mills and in other environments.

Other objects of the present invention will become apparent upon reading the following specification and referring to the accompanying drawings in which similar characters of reference represent corresponding parts in each of the several views.

Figure 1:
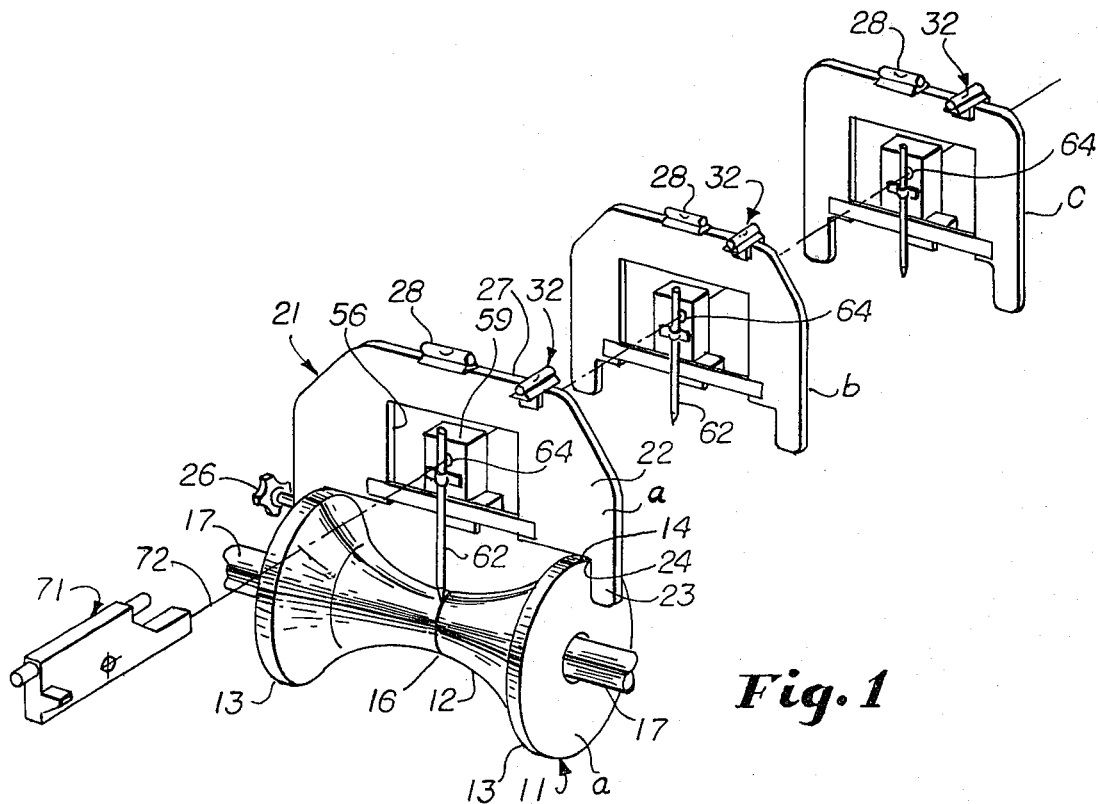
FIG. 1 is a schematic perspective view showing the invention used in the alignment of three of a series of bottom pipe rollers, it being understood that more rollers may be aligned in similar fashion.

A conventional pipe mill comprises a series of stands (not shown) in which are mounted by conventional means a series of rolls 11 marked for convenience in FIG. 1 with subscripts a, b and c, it being understood that more stands may be employed and that the shapes of the rolls are subject to variation depending upon particular pipe or other product being rolled. Each roll 11 has a curved surface 12 which gives shape to the material passing through the stand, the shape of each roll varying from stand to stand. Near the outer edge of each curved surface 12 is a flange 13 which, in the present invention, performs an important function. A marker 16 runs circumferentially around the center of each curved surface 12, being applied by scribing or other means. Each roller has a shaft 17. Each end of shaft 17 is received in the stand by means of bearings (not shown but well understood in this art). The conventional stand has means for raising and lowering the shaft 17, for levelling its axis, and also for moving it transversely-horizontally. It is essential to proper operation of the mill that the elevation of each shaft 17 be equal and that each shaft 17 be horizontal and that the center markings 16 be accurately in alignment. The present invention provides means for checking the accuracy of adjustment for each such factor.

Thus for each roll 11 there is a target 21 also marked for convenience in the accompanying drawing a, b and c in series. Each target is preferably shaped to accommodate the individual roll with which it is used. Each target has a frame 22 and on each side thereof depending from horizontal bottom surface 25 is a leg 23. The juncture of surface 25 with the inside of leg 23 comprises a corner 24 which is preferably slightly rounded and accurately engages the outer edge of each flange 13. When the target has been positioned on the roll, clamp screw 26 threaded into one of the legs 23 clamps against the side of one flange 13 to secure the target in place. On the center of the top edge 27 of target 22 a bubble 28 is located. When bubble 28 is centered, the target 22 and hence the roll 11 is horizontal, transversely.

Adjacent either side of top edge 27 on either face of the target 22 are vertical grooves 31. In certain usages of target 22 a bubble support 32 which has forward and rear legs 33 is slid down into the grooves 31. Bubble 34 is located on the top of support 32. When the bubble 34 is centered, the target 22 is accurately vertical.

Figure 3:
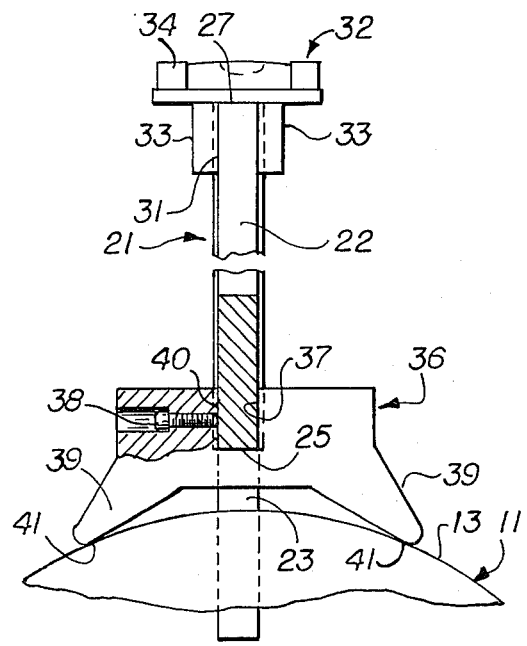
FIG. 3 is an enlarged sectional view taken substantially along the line 3—3 of FIG. 2.

To insure that the target 22 remains vertical, a target support 36 or 46 may be used. Directing attention to FIG. 3, grooves 40 are formed extending up from bottom surface 25 on the forward and rear face of frame 22. A slot 37 is formed extending down from the top of support 36. Thus the support 36 slides up from bottom edge 25, the slot 37 fitting in the grooves 40. Set screw 38 threaded into the support 36 engages target 22 and secures the support 36 in place. On either side there is an outward slanted leg 39 terminating in an accurately located point 41. The points 41 engage tangent to the periphery of flange 13. When the bubble 34 is centered, then the target 22 is vertical. Thus the support 36 insures accuracy of vertical alignment of the target 22.

Figure 4:
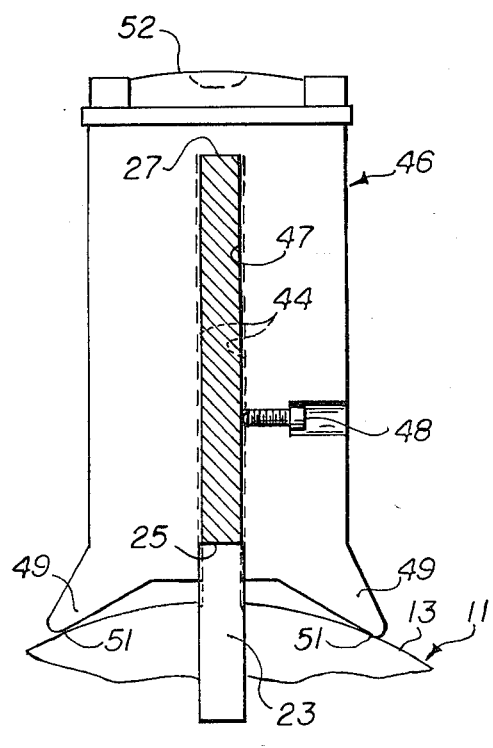
FIG. 4 is an enlarged sectional view taken substantially along the line 4—4 of FIG. 2.

Directing attention now to FIG. 4, a different type of target support 46 is illustrated. In this form of support, grooves 44 are formed extending down the front and rear face of frame 22 from the top edge 27 to the bottom edge 25. Support 46 has a slot 47 extending up from its bottom edge and this slot fits into the grooves 44. Set screw 48 threaded into support 46 engages the frame 22 and locks the support 46 relative to the frame 22. On either side outward slanted legs 49 are formed with accurately located points 51 which engage the peripheral surface of flange 13. A bubble 52 is located on the top of support 46 and insures that the target 22 is vertical.

Figure 2:
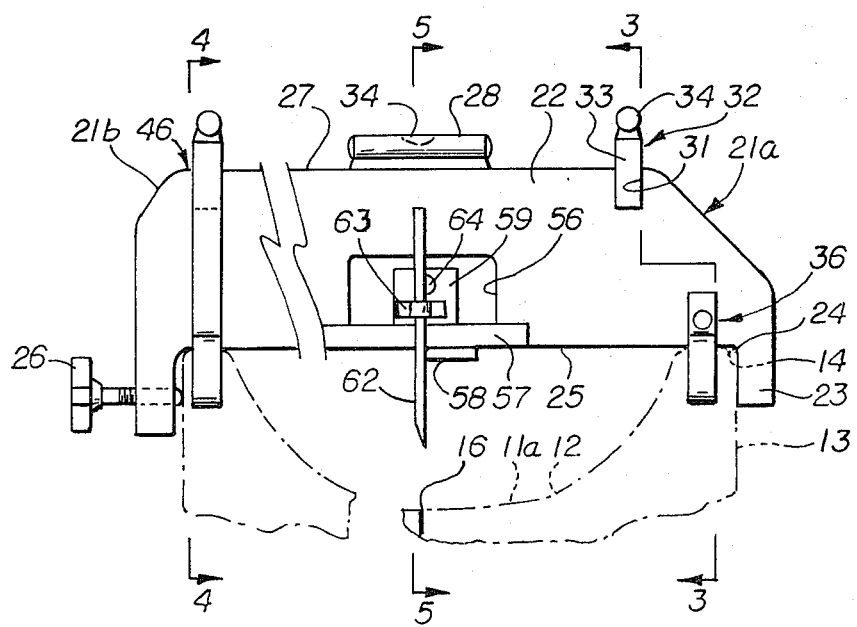
FIG. 2 is a front elevational view of two targets, the view being broken away in section to show the righthand and lefthand sides of the figure used in aligning different shape rolls.
Figure 5:
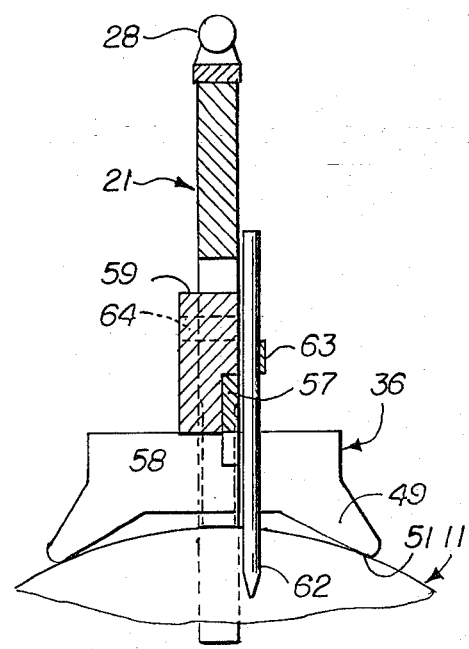
FIG. 5 is an enlarged sectional view taken substantially along the line 5—5 of FIG. 2.

Directing attention now to FIGS. 2 and 5, a window 56 is cut out in the center of the target extending upward from bottom edge 25. Along the bottom of the window and in accurate alignment with the target is a cross bar 57 which is provided with scale markings. A vernier 56 may be used with the scale markings for a purpose hereinafter set forth. Slideable along the bar 57 is a block 59 formed with a recess 61 so as to engage the cross bar 57 and move accurately relative thereto. Secured by bracket 63 to block 59 is an indicator 62 or pointer which is used for alignment with the center mark 16 on the roll 11. Hole 64 is formed in block 59 and its axis is accurately located transverse to the plane of frame 22. In fact, the indicator 62 accurately splits the hole 64.

In use, a laser instrument 71 is by means of a tripod or other support (not shown) located at one end of a series of stands. The beam 72 is accurately directed horizontally and along the center lines of the rolls. Roll 11a, closest to the instrument 71, is first adjusted. The beam 72 impinges upon block 59. The stand is first adjusted so that the beam 72 is at the same height as the hole 64 and that the bubble 28 is centered. This insures that the center line of the shaft 17 is at the right height and is horizontal. The block 59 is then moved transversely-horizontally so that the indicator 62 is in alignment with the mark 16 on the roll 11a and a reading of the scale on the cross bar 57 is obtained, which indicates to the operator the amount of adjustment horizontally-transversely which must be made. The means whereby the vertical and horizontal adjustments of each roll are performed form no part of this invention and are well known in the rolling mill art.

After the first roll 11a has been adjusted, the beam 72 passes through the hole 64 of the first roll and impinges upon the corresponding block 59 of the target 22b for the second roll 11b. The second roll is then adjusted similarly to the first and each additional roll is adjusted in its turn. When all of the rolls have been accurately adjusted, the beam 72 passes through the holes 64 in all of the targets. This insures that each roll is horizontal, is accurate in elevation and that its center is in line with the other rolls.

What is claimed is:

1. A target for attachment to a member which is adjustable vertically and horizontally and which member has a pair of first horizontal surfaces and a pair of first vertical surfaces, and which has a mark between said vertical surfaces, said target comprising
a frame formed with a second horizontal surface shaped to fit accurately upon said first horizontal surfaces, a pair of legs depending from said second horizontal surface and intersecting said second horizontal surface at opposed corners spaced apart to engage outside said first vertical surfaces, level means on said frame to indicate when said frame is vertical, a block having a hole therein, mounting means mounting said block for accurate horizontal movement transverse to said frame and parallel to the horizontal adjustment of said member, and indicator means on said block indicating the distance of said hole from a vertical line through said mark.

2. A target according to claim 1 in which said frame is formed with a window, said block being in said window and which further comprises a scale fixed relative to said frame and readable with said indicator means, said indicator means comprising a vertical member having a pointer at its lower end.

3. A target according to claim 1 and in which said frame has a top surface parallel to said second surface which further comprises a second level means fixed to said top surface to indicate when said frame is horizontal.

4. A target for use with a member in which said horizontal surfaces are tangent to round surfaces having a common axis parallel to the horizontal direction of movement of said block according to claim 1 which further comprises a target support and means mounting said target support on said frame transverse to said frame, said target support having a pair of outward diverging second legs shaped to engage tangent to said round surface, said level means being cooperable with said target support and said second legs to indicate vertical position of said frame and thereby horizontal orientation of said hole in said block.

5. A target according to claim 4 in which said level means is fixed to said target support.

6. A target according to claim 4 in which said target support is formed with a slot extending downward from the top of said support and said frame fits in said slot.

7. A target according to claim 4 in which said frame has a top surface parallel to said second horizontal surface and said target support is formed with a slot extending upward from the bottom of said support, said frame fitting in said slot.

8. A target according to claim 7 in which said level means is fixed to the top of said target support.

* * * * *